US011112942B2

(12) United States Patent
Leatham

(10) Patent No.: US 11,112,942 B2
(45) Date of Patent: *Sep. 7, 2021

(54) PROVIDING CONTENT VIA MULTIPLE DISPLAY DEVICES

(71) Applicant: Amazon Technologies, Inc., Seattle, WA (US)

(72) Inventor: Richard Andrew Leatham, London (GB)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/801,600

(22) Filed: Feb. 26, 2020

(65) Prior Publication Data

US 2020/0201490 A1 Jun. 25, 2020

Related U.S. Application Data

(63) Continuation of application No. 15/164,070, filed on May 25, 2016, now Pat. No. 10,579,215, which is a
(Continued)

(51) Int. Cl.
*G06F 3/048* (2013.01)
*G06F 3/0482* (2013.01)
(Continued)

(52) U.S. Cl.
CPC ............ *G06F 3/0482* (2013.01); *G06F 3/048* (2013.01); *G06F 3/04817* (2013.01);
(Continued)

(58) Field of Classification Search
CPC ........... H04N 21/4126; H04N 21/4307; H04N 21/44008
See application file for complete search history.

(56) References Cited

U.S. PATENT DOCUMENTS 5,260,556 A 11/1993 Lake et al.
5,596,705 A 1/1997 Reimer et al.
(Continued)

FOREIGN PATENT DOCUMENTS

EP 1993282 11/2008
EP 2071578 6/2009
(Continued)

OTHER PUBLICATIONS

Palacio-Baus et al; Current Challenges of Interactive Digital Television; 2017; IEEE; 6 pages.*
(Continued)

*Primary Examiner* — Linh K Pham
(74) *Attorney, Agent, or Firm* — Thomas | Horstermeyer, LLP

(57) ABSTRACT

Disclosed are various embodiments for providing content via multiple display devices. First content is transmitted to a second computing device for rendering on a first display device. A current state of the first content rendered on the first display device is determined. A directive is sent to a third computing device to render second content that is synchronized to be relevant to the current state of the first content on a second display device corresponding to the third computing device. The second content comprises a list of cast members currently on screen in the first content.

20 Claims, 5 Drawing Sheets

Related U.S. Application Data continuation of application No. 13/709,768, filed on Dec. 10, 2012, now Pat. No. 9,389,745.

(51) Int. Cl.

| | | |
|---|---|---|
| *H04N 21/41* | (2011.01) | |
| *H04N 21/472* | (2011.01) | |
| *G06F 3/0481* | (2013.01) | |
| *G06F 3/14* | (2006.01) | |
| *H04N 21/431* | (2011.01) | |
| *H04N 21/4722* | (2011.01) | |
| *H04N 21/81* | (2011.01) | |
| *G06F 16/40* | (2019.01) | |

(52) U.S. Cl.
CPC ....... *G06F 3/1423* (2013.01); *H04N 21/4122* (2013.01); *H04N 21/4126* (2013.01); *H04N 21/4316* (2013.01); *H04N 21/4722* (2013.01); *H04N 21/47202* (2013.01); *H04N 21/8133* (2013.01); *G06F 16/40* (2019.01)

(56) References Cited

U.S. PATENT DOCUMENTS

| | | | |
|---|---|---|---|
| 5,691,527 | A | 11/1997 | Hara et al. |
| 5,692,212 | A | 11/1997 | Roach |
| 5,781,730 | A | 7/1998 | Reimer et al. |
| 6,065,042 | A | 5/2000 | Reimer et al. |
| 6,556,722 | B1 | 4/2003 | Russell et al. |
| 7,103,541 | B2 | 9/2006 | Attias et al. |
| 7,237,251 | B1 | 6/2007 | Oz et al. |
| 7,293,275 | B1 | 11/2007 | Krieger et al. |
| 7,444,593 | B1 | 10/2008 | Reid |
| 7,558,865 | B2 | 7/2009 | Lin et al. |
| 7,774,075 | B2 | 8/2010 | Lin |
| 7,814,521 | B2 | 10/2010 | Ou et al. |
| 7,840,691 | B1 | 11/2010 | De et al. |
| 8,161,082 | B2 | 4/2012 | Israel et al. |
| 8,209,396 | B1 | 6/2012 | Raman et al. |
| 8,250,605 | B2 | 8/2012 | Opaluch |
| 8,365,235 | B2 | 1/2013 | Hunt et al. |
| 8,510,775 | B2 | 8/2013 | Lafreniere et al. |
| 8,510,779 | B2 | 8/2013 | Slothouber et al. |
| 8,552,983 | B2 | 10/2013 | Chiu |
| 8,644,702 | B1 | 2/2014 | Kalajan |
| 8,689,255 | B1 | 4/2014 | Gregov et al. |
| 8,763,041 | B2 | 6/2014 | Timmermann et al. |
| 8,849,943 | B2 | 9/2014 | Huang et al. |
| 8,955,021 | B1 | 2/2015 | Treder et al. |
| 9,078,030 | B2 | 7/2015 | Kuo |
| 9,113,128 | B1 | 8/2015 | Aliverti et al. |
| 9,241,187 | B2 | 1/2016 | Ricci |
| 9,491,033 | B1 | 11/2016 | Soyannwo et al. |
| 2002/0022959 | A1 | 2/2002 | Nakamura et al. |
| 2002/0042920 | A1 | 4/2002 | Thomas et al. |
| 2002/0059610 | A1 | 5/2002 | Ellis |
| 2003/0050863 | A1 | 3/2003 | Radwin |
| 2004/0028258 | A1 | 1/2004 | Attias et al. |
| 2004/0056097 | A1 | 3/2004 | Walmsley et al. |
| 2004/0133919 | A1 | 7/2004 | Incentis |
| 2004/0162829 | A1 | 8/2004 | Gabos et al. |
| 2004/0197088 | A1 | 10/2004 | Ferman et al. |
| 2005/0160465 | A1 | 7/2005 | Walker |
| 2005/0177538 | A1 | 8/2005 | Shimizu et al. |
| 2005/0264527 | A1 | 12/2005 | Lin |
| 2006/0007452 | A1 | 1/2006 | Gaspard et al. |
| 2006/0015818 | A1 | 1/2006 | Chaudhri et al. |
| 2006/0184538 | A1 | 8/2006 | Randall et al. |
| 2006/0271836 | A1 | 11/2006 | Morford et al. |
| 2006/0278722 | A1 | 12/2006 | Tominaga |
| 2007/0003223 | A1 | 1/2007 | Armstrong et al. |
| 2007/0061724 | A1 | 3/2007 | Slothouber et al. |
| 2007/0124756 | A1 | 5/2007 | Covell et al. |
| 2007/0143737 | A1 | 6/2007 | Huang et al. |
| 2007/0165022 | A1 | 7/2007 | Peleg et al. |
| 2007/0250901 | A1 | 10/2007 | McIntire et al. |
| 2008/0002021 | A1 | 1/2008 | Guo et al. |
| 2008/0005222 | A1 | 1/2008 | Lambert et al. |
| 2008/0066135 | A1 | 3/2008 | Brodersen et al. |
| 2008/0172293 | A1 | 7/2008 | Raskin et al. |
| 2008/0196072 | A1 | 8/2008 | Chun |
| 2008/0209465 | A1 | 8/2008 | Thomas et al. |
| 2008/0235749 | A1 | 9/2008 | Jain et al. |
| 2009/0018898 | A1 | 1/2009 | Genen |
| 2009/0019009 | A1 | 1/2009 | Byers |
| 2009/0081950 | A1 | 3/2009 | Matsubara et al. |
| 2009/0089186 | A1 | 4/2009 | Paolini |
| 2009/0090786 | A1 | 4/2009 | Hovis |
| 2009/0094113 | A1 | 4/2009 | Berry et al. |
| 2009/0138906 | A1 | 5/2009 | Eide et al. |
| 2009/0199098 | A1 | 8/2009 | Kweon et al. |
| 2009/0228919 | A1* | 9/2009 | Zott ............... H04N 7/17318 725/34 |
| 2010/0057782 | A1 | 3/2010 | McGowan et al. |
| 2010/0092079 | A1 | 4/2010 | Aller |
| 2010/0103106 | A1 | 4/2010 | Chiu |
| 2010/0153831 | A1 | 6/2010 | Beaton |
| 2010/0154007 | A1 | 6/2010 | Touboul et al. |
| 2010/0199219 | A1 | 8/2010 | Poniatowski et al. |
| 2010/0222102 | A1 | 9/2010 | Rodriguez |
| 2010/0251292 | A1 | 9/2010 | Srinivasan et al. |
| 2010/0287053 | A1 | 11/2010 | Ganong et al. |
| 2010/0287592 | A1 | 11/2010 | Patten et al. |
| 2010/0312547 | A1 | 12/2010 | Van et al. |
| 2010/0312596 | A1 | 12/2010 | Saffari et al. |
| 2011/0023073 | A1 | 1/2011 | McCarthy et al. |
| 2011/0047299 | A1 | 2/2011 | Yu et al. |
| 2011/0049250 | A1 | 3/2011 | Hovis et al. |
| 2011/0067061 | A1 | 3/2011 | Karaoguz et al. |
| 2011/0083111 | A1 | 4/2011 | Forutanpour et al. |
| 2011/0131520 | A1 | 6/2011 | Al-Shaykh et al. |
| 2011/0154405 | A1 | 6/2011 | Isaias |
| 2011/0162007 | A1 | 6/2011 | Karaoguz et al. |
| 2011/0167456 | A1 | 7/2011 | Kokenos et al. |
| 2011/0181780 | A1 | 7/2011 | Barton |
| 2011/0246295 | A1 | 10/2011 | Kejariwal et al. |
| 2011/0246495 | A1 | 10/2011 | Mallinson |
| 2011/0270923 | A1 | 11/2011 | Jones et al. |
| 2011/0270959 | A1 | 11/2011 | Schlusser et al. |
| 2011/0282906 | A1 | 11/2011 | Wong |
| 2011/0289534 | A1 | 11/2011 | Jordan et al. |
| 2011/0296465 | A1 | 12/2011 | Krishnan et al. |
| 2012/0014663 | A1 | 1/2012 | Knight et al. |
| 2012/0033140 | A1 | 2/2012 | Xu |
| 2012/0054615 | A1 | 3/2012 | Lin et al. |
| 2012/0072953 | A1 | 3/2012 | James et al. |
| 2012/0096499 | A1 | 4/2012 | Dasher et al. |
| 2012/0151530 | A1 | 6/2012 | Krieger et al. |
| 2012/0210205 | A1 | 8/2012 | Sherwood et al. |
| 2012/0220223 | A1 | 8/2012 | Rose et al. |
| 2012/0238363 | A1 | 9/2012 | Watanabe et al. |
| 2012/0240161 | A1 | 9/2012 | Kuo |
| 2012/0256000 | A1 | 10/2012 | Cok |
| 2012/0256007 | A1 | 10/2012 | Cok |
| 2012/0257766 | A1 | 10/2012 | Seymour et al. |
| 2012/0308202 | A1 | 12/2012 | Murata et al. |
| 2013/0014155 | A1 | 1/2013 | Clarke et al. |
| 2013/0021535 | A1 | 1/2013 | Kim et al. |
| 2013/0024783 | A1* | 1/2013 | Brakensiek ............ G06F 3/0483 715/753 |
| 2013/0057543 | A1 | 3/2013 | Mann et al. |
| 2013/0060660 | A1 | 3/2013 | Maskatia et al. |
| 2013/0074125 | A1* | 3/2013 | Hao ..................... H04W 4/14 725/40 |
| 2013/0094013 | A1 | 4/2013 | Hovis et al. |
| 2013/0110672 | A1 | 5/2013 | Yang et al. |
| 2013/0113830 | A1 | 5/2013 | Suzuki |
| 2013/0113993 | A1 | 5/2013 | Dagit |
| 2013/0115974 | A1 | 5/2013 | Lee et al. |
| 2013/0144727 | A1 | 6/2013 | Morot-Gaudry et al. |
| 2013/0194510 | A1* | 8/2013 | Freundlich ....... H04N 21/41407 348/723 |
| 2013/0219434 | A1 | 8/2013 | Farrell et al. |

(56) References Cited

U.S. PATENT DOCUMENTS

| | | | |
|---|---|---|---|
| 2013/0266292 | A1 | 10/2013 | Sandrew et al. |
| 2013/0291018 | A1 | 10/2013 | Billings et al. |
| 2014/0035726 | A1 | 2/2014 | Schoner et al. |
| 2014/0035913 | A1 | 2/2014 | Higgins et al. |
| 2014/0043332 | A1 | 2/2014 | Rollett |
| 2014/0068670 | A1 | 3/2014 | Timmermann et al. |
| 2014/0122564 | A1 | 5/2014 | Arora et al. |
| 2014/0130102 | A1 | 5/2014 | Iijima et al. |
| 2014/0134947 | A1 | 5/2014 | Stouder-Studenmund |
| 2014/0152894 | A1 | 6/2014 | Childs et al. |
| 2014/0208355 | A1 | 7/2014 | Gregov et al. |
| 2014/0281985 | A1 | 9/2014 | Garrison et al. |
| 2015/0095774 | A1 | 4/2015 | Bates et al. |
| 2015/0156562 | A1 | 6/2015 | Treder et al. |
| 2015/0193069 | A1 | 7/2015 | Di et al. |
| 2015/0195474 | A1 | 7/2015 | Lu |
| 2015/0235672 | A1 | 8/2015 | Cudak et al. |
| 2015/0339508 | A1 | 11/2015 | Hosokane |
| 2015/0357001 | A1 | 12/2015 | Aliverti et al. |

FOREIGN PATENT DOCUMENTS

| | | |
|---|---|---|
| WO | 2003084229 | 10/2003 |
| WO | WO2003084229 | 10/2003 |
| WO | 2014036413 | 3/2014 |

OTHER PUBLICATIONS

U.S. Appl. No. 14/218,408, filed Mar. 18, 2014, Final Office Action dated Jul. 27, 2015.
U.S. Appl. No. 14/218,408, filed Mar. 18, 2014, Final Office Action dated Nov. 25, 2016.
U.S. Appl. No. 14/218,408, filed Mar. 18, 2014, Non-Final Office Action dated Feb. 12, 2015.
U.S. Appl. No. 14/218,408, filed Mar. 18, 2014, Non-final Office Action dated Mar. 30, 2017.
U.S. Appl. No. 14/218,408, filed Mar. 18, 2014, Non-Final Office Action dated Apr. 11, 2016.
U.S. Appl. No. 14/218,408, filed Mar. 18, 2014, Response to Final Office Action dated Jul. 27, 2015.
U.S. Appl. No. 14/218,408, filed Mar. 18, 2014, Response to Non-Final Office Action dated Feb. 12, 2015.
U.S. Appl. No. 14/218,408, filed Mar. 18, 2014, Response to Non-Final Office Action dated Apr. 11, 2016.
U.S. Appl. No. 14/225,864, filed Mar. 26, 2014, Final Office Action dated Jul. 13, 2015.
U.S. Appl. No. 14/225,864, filed Mar. 26, 2014, Non-Final Office Action dated Mar. 3, 2015.
U.S. Appl. No. 14/225,864, filed Mar. 26, 2014, Response to Final Office Action dated Jul. 13, 2015.
U.S. Appl. No. 14/225,864, filed Mar. 26, 2014, Response to Non-Final Office Action dated Mar. 3, 2015.
U.S. Appl. No. 14/493,970, filed Sep. 23, 2014, Non-Final Office Action dated Jun. 6, 2017.
U.S. Appl. No. 14/493,970, filed Sep. 23, 2014, Non-Final Office Action dated Jul. 29, 2016.
U.S. Appl. No. 14/493,970, filed Sep. 23, 2014, Response to Non-Final Office Action dated Jul. 29, 2016.
U.S. Appl. No. 14/615,950, filed Feb. 6, 2015, Final Office Action dated Dec. 1, 2016.
U.S. Appl. No. 14/615,950, filed Feb. 6, 2015, Non-Final Office Action dated May 26, 2016.
U.S. Appl. No. 14/615,950, filed Feb. 6, 2015, Response to Election/Restriction dated Feb. 10, 2016.
U.S. Appl. No. 14/615,950, filed Feb. 6, 2015, Response to Non-Final Office Action dated May 26, 2016.
U.S. Appl. No. 14/615,950, filed Feb. 6, 2015, Restriction/Election dated Feb. 10, 2016.
U.S. Appl. No. 14/826,508, filed Aug. 14, 2015, Non-Final Office Action dated Oct. 26, 2016.
U.S. Appl. No. 14/826,508, filed Aug. 14, 2015, Response to Non-Final Office Action dated Oct. 26, 2016.
U.S. Appl. No. 15/154,233, filed May 13, 2016, Non-Final Office Action dated Jun. 2, 2017.
U.S. Appl. No. 15/154,233, filed May 13, 2016, Notice of Allowance dated Nov. 15, 2017.
U.S. Appl. No. 15/154,233, filed May 13, 2016, Response to Non-Final Office Action dated Jun. 2, 2017.
U.S. Appl. No. 15/154,233, filed May 13, 2016, Response to Restriction Requirement dated Feb. 3, 2017.
U.S. Appl. No. 15/154,233, filed May 13, 2016, Restriction/Election dated Feb. 3, 2017.
U.S. Appl. No. 15/164,070, filed May 25, 2016, Notice of Allowance dated Oct. 18, 2019.
U.S. Appl. No. 15/665,668, filed Aug. 1, 2017, Non-Final Office Action dated Jan. 21, 2020.
U.S. Appl. No. 15/898,103, filed Feb. 15, 2018, Non-Final Office Action dated Sep. 18, 2019.
U.S. Appl. No. 13/778,846 entitled, "Shopping Experience Using Multiple Computing Devices" filed Feb. 27, 2013.
U.S. Appl. No. 13/927,970 entitled "Providing Soundtrack Information During Playback of Video Content" filed Jun. 26, 2013.
U.S. Appl. No. 14/034,055 entitled "Playback of Content Using Multiple Devices" filed Sep. 23, 2013.
U.S. Appl. No. 13/709,768, filed Dec. 10, 2012 entitled Providing Content Via Multiple Display Devices.
U.S. Appl. No. 15/898,103, filed Feb. 15, 2018, Final Office Action dated Feb. 12, 2020.
"Entertainment is more amazing with Xbox SmartGlass," Xbox SmartGlass 1 Companion Application—Xbox.com, "retrieved from http://www.xbox.com/en-US/smartglass," retrieved Dec. 4, 2012.
"Hulu 'Face Match' feature attaches an actor's entire history to their mug," Engadget, retrieved from http://www.engadget.com/2011/12/08/hulu-face-match-feature-attaches-an-actors-entire-history-to/, Dec. 8, 2011.
"Sony Pictures to smarten up Blu-ray with MovieIQ, the 'killer ap for BD-Live,'" Engadget, retrieved from http://www.engadget.com/2009/06/18/sony-pictures-to-smarten-up-blu-ray-with-movieiq-the-killer-ap/, Jun. 18, 2009.
"TVPlus for the iPad," iTunes Store, retrieved from "http://itunes.apple.com/us/app/tvplus/id444774882?mt=B," updated Apr. 13, 2012.
"Wii U GamePad," Wii U Official Site—Features, retrieved from "http://www.nintendo.com/wiiu/features/," retrieved Dec. 4, 2012.
Canadian Patent Application CA2, 882,899, Office Action dated Apr. 25, 2017.
Canadian Patent Application CA2,882,899, Office Action dated Apr. 6, 2016.
European Patent Application 18194915.7 filed on Aug. 30, 2013, Office Action dated Nov. 7, 2019.
European Patent Application EP13832505.5, Extended European Search Report dated Mar. 15, 2016.
International Searching Authority and Written Opinion dated Mar. 21, 2014 for PCT/US2013/057543 filed Aug. 30, 2013.
Kim et al., Inter-Device Media Synchonization in Multi-screen environment; Google: "http://www.w3.org/2013/10/tv-workshop/papers/webtv4_submission_26_pdf;" 2013; 3 paQes.
SO/IEC 18004:2006. Information technology—Automatic identification and data capture techniques—QR Code 2005 bar code symbology specification. International Organization for Standardization, Geneva, Switzerland.
U.S. Appl. No. 13/227,097, filed Sep. 7, 2011, Non-Final Office Action dated Apr. 9, 2013.
U.S. Appl. No. 13/227,097, filed Sep. 7, 2011, Notice of Allowance dated Oct. 22, 2013.
U.S. Appl. No. 13/227,097, filed Sep. 7, 2011, Response to Non-Final Office Action dated Apr. 9, 2013.
U.S. Appl. No. 13/601,210, filed Aug. 31, 2012, Final Office Action dated Jan. 2, 2014.
U.S. Appl. No. 13/601,210, filed Aug. 31, 2012, Non-Final Office Action dated Aug. 1, 2013.
U.S. Appl. No. 13/601,210, filed Aug. 31, 2012, Notice of Allowance dated Sep. 23, 2014.

(56) References Cited

OTHER PUBLICATIONS

U.S. Appl. No. 13/601,210, filed Aug. 31, 2012, Response to Final Office Action dated Jan. 2, 2014.
U.S. Appl. No. 13/601,210, filed Aug. 31, 2012, Response to Non-Final Office Action dated Aug. 1, 2013.
U.S. Appl. No. 13/601,235, filed Aug. 31, 2012, Non-Final Office Action dated Sep. 11, 2014.
U.S. Appl. No. 13/601,235, filed Aug. 31, 2012, Notice of Allowance dated Mar. 27, 2015.
U.S. Appl. No. 13/601,235, filed Aug. 31, 2012, Response to Non-Final Office Action dated Sep. 11, 2014.
U.S. Appl. No. 13/601,267, filed Aug. 31, 2012, Non-Final Office Action dated Aug. 14, 2013.
U.S. Appl. No. 13/601,267, filed Aug. 31, 2012, Notice of Allowance dated Jan. 21, 2014.
U.S. Appl. No. 13/601,267, filed Aug. 31, 2012, Response to Non-Final Office Action dated Aug. 14, 2013.
U.S. Appl. No. 13/709,768, filed Dec. 10, 2012, Final Office Action dated Oct. 23, 2015.
U.S. Appl. No. 13/709,768, filed Dec. 10, 2012, Non-Final Office Action dated Apr. 21, 2015.
U.S. Appl. No. 13/709,768, filed Dec. 10, 2012, Non-Final Office Action dated Oct. 3, 2014.
U.S. Appl. No. 13/709,768, filed Dec. 10, 2012, Notice of Allowance dated Mar. 17, 2016.
U.S. Appl. No. 13/709,768, filed Dec. 10, 2012, Response to Final Office Action dated Oct. 23, 2015.
U.S. Appl. No. 13/709,768, filed Dec. 10, 2012, Response to Non-Final Office Action dated Apr. 21, 2015.
U.S. Appl. No. 13/709,768, filed Dec. 10, 2012, Response to Non-Final Office Action dated Oct. 3, 2014.
U.S. Appl. No. 13/778,846, filed Feb. 27, 2013, Final Office Action dated Jul. 29, 2016.
U.S. Appl. No. 13/778,846, filed Feb. 27, 2013, Non-Final Office Action dated Jan. 20, 2016.
U.S. Appl. No. 13/778,846, filed Feb. 27, 2013, Non-Final Office Action dated Jun. 5, 2017.
U.S. Appl. No. 13/778,846, filed Feb. 27, 2013, Response to Final Office Action dated Jul. 29, 2016.
U.S. Appl. No. 13/778,846, filed Feb. 27, 2013, Response to Non-Final Office Action dated Jan. 20, 2016.
U.S. Appl. No. 13/927,970, filed Jun. 26, 2013, Non-Final Office Action dated Oct. 3, 2019.
U.S. Appl. No. 13/927,970, filed Jun. 26, 2013, Response to Restriction/Election dated Oct. 5, 2016.
U.S. Appl. No. 13/927,970, filed Jun. 26, 2013, Restriction/Election dated Oct. 5, 2016.
U.S. Appl. No. 14/034,055, filed Sep. 23, 2013, Examiner's Answer dated May 24, 2017.
U.S. Appl. No. 14/034,055, filed Sep. 23, 2013, Final Office Action dated Jan. 6, 2016.
U.S. Appl. No. 14/034,055, filed Sep. 23, 2013, Final Office Action dated Jul. 29, 2016.
U.S. Appl. No. 14/034,055, filed Sep. 23, 2013, Non-Final Office Action dated Apr. 7, 2016.
U.S. Appl. No. 14/034,055, filed Sep. 23, 2013, Non-Final Office Action dated Aug. 3, 2015.
U.S. Appl. No. 14/034,055, filed Sep. 23, 2013, Response to Final Office Action dated Jan. 6, 2016.
U.S. Appl. No. 14/034,055, filed Sep. 23, 2013, Response to Final Office Action dated Jul. 29, 2016.
U.S. Appl. No. 14/034,055, filed Sep. 23, 2013, Response to Non-Final Office Action dated Apr. 7, 2016.
U.S. Appl. No. 14/034,055, filed Sep. 23, 2013, Response to Non-Final Office Action dated Aug. 3, 2015.
U.S. Appl. No. 15/665,668, filed Aug. 1, 2017, Final Office Action dated Jul. 8, 2020.
U.S. Appl. No. 13/927,970, filed Jun. 26, 2013, Notice of Allowance dated Feb. 3, 2021.
Mearian, L. (2002). Visa eyes voice recognition for online purchases. Computerworld, 36 (45), 22. Retrieved from https://search.proquest.com/trade-journals/visa-eyes-voice-recognition-online-purchases/docview/216092675/se-2?accountid=14753.

* cited by examiner

PROVIDING CONTENT VIA MULTIPLE DISPLAY DEVICES

CROSS-REFERENCE TO RELATED APPLICATIONS

This application is a continuation of and claims priority to U.S. application Ser. No. 15/164,070 entitled, "PROVIDING CONTENT VIA MULTIPLE DISPLAY DEVICES," filed on May 25, 2016, which is a continuation of and claims priority to U.S. application Ser. No. 13/709,768 entitled, "PROVIDING CONTENT VIA MULTIPLE DISPLAY DEVICES," filed on Dec. 10, 2012, which issued as U.S. Pat. No. 9,389,745 on Jul. 12, 2016, which are incorporated by reference herein in their entireties.

BACKGROUND

Users may access content through a computing device having a single, relatively large display, such as a digital television. Interacting with such a device may be cumbersome. For example, providing textual input to the digital television may involve an on-screen keyboard that uses arrow buttons on a remote control to select the keys. Further, it may be difficult to provide additional information about the content being rendered due to readability, aesthetics, or other concerns.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to providing synchronized content via a primary display device and one or more secondary display devices. A primary display device may correspond to a digital television, a smart television, a video game console coupled to a display device, a set-top box coupled to a display device, a projection device, and/or other forms of computing devices that may be coupled to relatively large displays. For a variety of reasons, it may be desirable to present content supplemental to that being shown on the primary display device through one or more secondary display devices. Such secondary display devices may correspond to tablet systems, smart phones, electronic book readers, laptop computers, and/or other devices.

Figure 1:
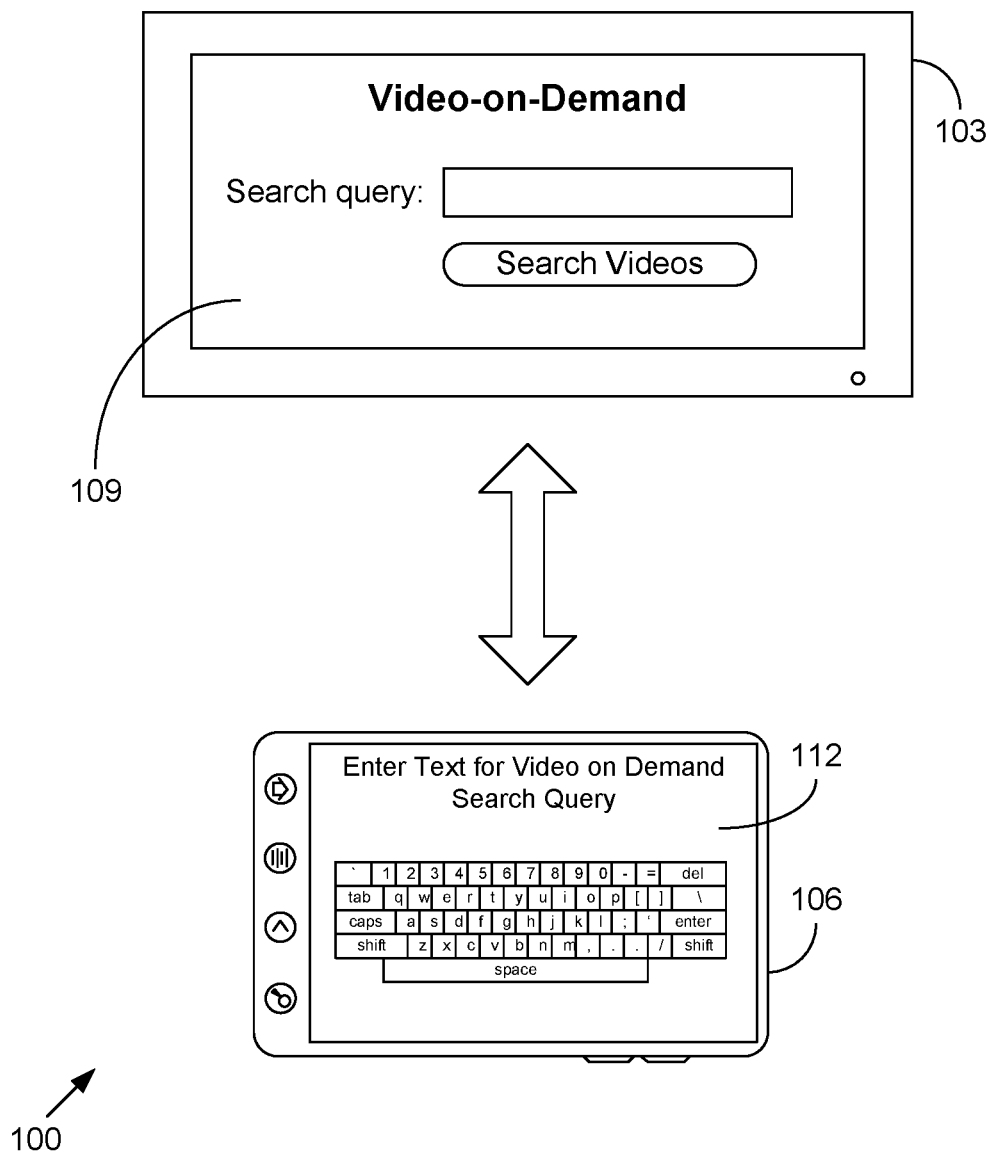
FIG. 1 is a drawing of an exemplary scenario involving a networked environment according to various embodiments of the present disclosure.

With reference to FIG. 1, shown is an exemplary scenario involving a networked environment 100 according to various embodiments of the present disclosure, which provide an extended display for a primary display device 103 through the use of one or more secondary display devices 106. The secondary display devices present content and/or user interfaces that are synchronized in some way to the content and/or user interfaces shown on the primary display device.

According to the non-limiting example depicted in FIG. 1, when a user selects a text input box in a user interface rendered on a digital television corresponding to the primary display device 103, an on-screen keyboard may be rendered on a touchscreen of a tablet corresponding to the secondary display device 106. The user interface rendered on the digital television corresponds to primary content 109, while the on-screen keyboard shown on the tablet corresponds to the secondary content 112 that supplements the current state of the primary content 109 in some way. This may facilitate relatively easy text entry as compared to a pointer or arrow keys on a remote for the digital television. As another non-limiting example, when a user watches a movie or other video content on a digital television corresponding to a primary display device, supplemental content relating to cast members, biographies, filmographies, trivia, on-screen goofs, etc. may be shown on a tablet corresponding to a secondary display device at a time relative to the current point in the movie. This allows the supplemental content to be rendered on an extended display so as to avoid interfering with the rendered movie on the primary display.

Various techniques relating to providing extrinsic data in connection with video content features are described in U.S. patent application Ser. No. 13/227,097 filed on Sep. 7, 2011 entitled "SYNCHRONIZING VIDEO CONTENT WITH EXTRINSIC DATA," U.S. patent application Ser. No. 13/601,267 filed on Aug. 31, 2012 entitled "ENHANCING VIDEO CONTENT WITH EXTRINSIC DATA," U.S. patent application Ser. No. 13/601,235 filed on Aug. 31, 2012 entitled "TIMELINE INTERFACE FOR VIDEO CONTENT," U.S. patent application Ser. No. 13/601,210 filed on Aug. 31, 2012 entitled "PROVIDING EXTRINSIC DATA FOR VIDEO CONTENT," all of which are incorporated by reference herein in their entirety.

In the following discussion, a general description of the system and its components is provided, followed by a discussion of the operation of the same.

Figure 2:
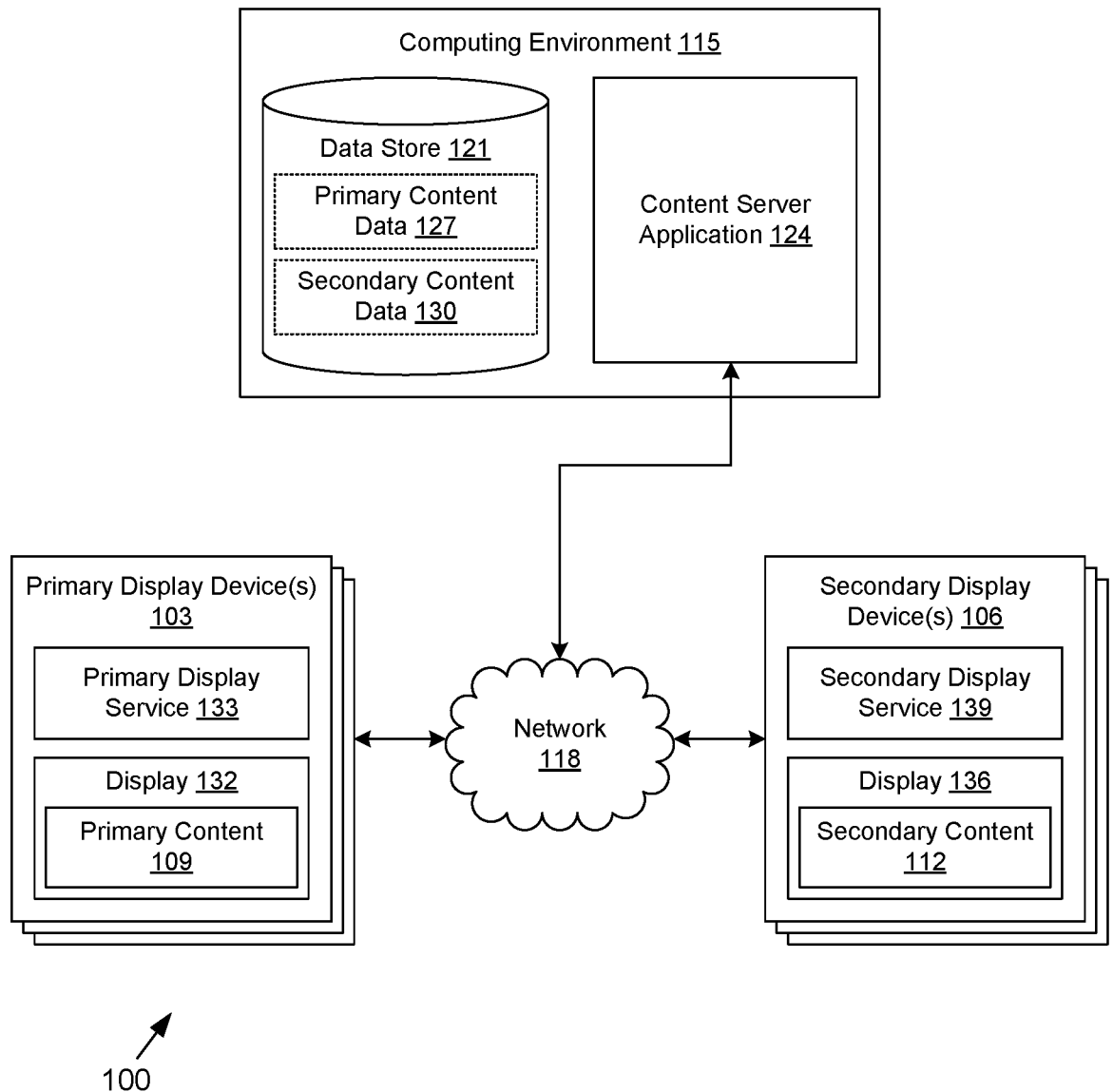
FIG. 2 is a drawing of the networked environment of FIG. 1 according to various embodiments of the present disclosure.

With reference to FIG. 2, shown is a networked environment 100 according to various embodiments. The networked environment 100 includes a computing environment 115, one or more primary display devices 103, and one or more secondary display devices 106 in data communication via a network 118. The network 118 includes, for example, the Internet, intranets, extranets, wide area networks (WANs), local area networks (LANs), wired networks, wireless networks, or other suitable networks, etc., or any combination of two or more such networks.

The computing environment 115 may comprise, for example, a server computer or any other system providing computing capability. Alternatively, the computing environment 115 may employ a plurality of computing devices that are arranged, for example, in one or more server banks or computer banks or other arrangements. Such computing devices may be located in a single installation or may be distributed among many different geographical locations. For example, the computing environment 115 may include a plurality of computing devices that together may comprise a cloud computing resource, a grid computing resource, and/or any other distributed computing arrangement. In some cases, the computing environment 115 may correspond to an elastic computing resource where the allotted capacity of processing, network, storage, or other computing-related resources may vary over time.

Various applications and/or other functionality may be executed in the computing environment 115 according to various embodiments. Also, various data is stored in a data store 121 that is accessible to the computing environment 115. The data store 121 may be representative of a plurality of data stores 121 as can be appreciated. The data stored in the data store 121, for example, is associated with the operation of the various applications and/or functional entities described below.

The components executed on the computing environment 115, for example, include a content server application 124 and other applications, services, processes, systems, engines, or functionality not discussed in detail herein. The content server application 124 is executed to serve up data corresponding to the primary content 109 (FIG. 1), the secondary content 112 (FIG. 1), and/or other data. The content server application 124 may send data using protocols such as hypertext transfer protocol (HTTP), real-time transport protocol (RTP), real-time streaming protocol (RTSP), simple object access protocol (SOAP), representational state transfer (REST), and/or other protocols. For example, the content server application 124 may comprise a commercially available HTTP server such as Apache HTTP server, Apache Tomcat, Microsoft Internet Information Services (IIS), and/or other servers.

The data stored in the data store 121 includes, for example, primary content data 127, secondary content data 130, and potentially other data. The primary content data 127 may correspond to the primary content 109 and may comprise video content features such as movies and television programs, network pages, and/or other forms of content. The secondary content data 130 may correspond to the secondary content 112, which may supplement or augment the primary content 109 in some way. For example, the secondary content 112 may provide more detailed information regarding an item from the primary content 109 that is currently selected. The secondary content data 130 may comprise video, audio, images, network pages, and/or other data.

The primary display device 103 is representative of a plurality of client devices that may be coupled to the network 118. The primary display device 103 may comprise, for example, a processor-based system such as a computer system. Such a computer system may be embodied in the form of a digital television, a desktop computer, a laptop computer, personal digital assistants, cellular telephones, smartphones, set-top boxes, music players, web pads, tablet computer systems, game consoles, electronic book readers, or other devices with like capability. The primary display device 103 includes a display 132. The display 132 may comprise, for example, one or more devices such as liquid crystal display (LCD) displays, gas plasma-based flat panel displays, organic light emitting diode (OLED) displays, LCD projectors, or other types of display devices, etc.

The primary display device 103 may be configured to execute various applications such as a primary display service 133 and/or other applications. The primary display service 133 may be executed in a primary display device 103, for example, to access primary content data 127 served up by the computing environment 115 and/or other servers, thereby rendering the primary content 109 on the display 132. The primary display service 133 may, for example, include a video player, a browser, a mobile application, etc., and the primary content 109 may correspond to a video content feature, a network page, a mobile application screen, etc. The primary display device 103 may be configured to execute applications beyond the primary display service 133 such as, for example, browsers, mobile applications, email applications, social networking applications, and/or other applications.

The secondary display device 106 is representative of a plurality of client devices that may be coupled to the network 118. The secondary display device 106 may comprise, for example, a processor-based system such as a computer system. Such a computer system may be embodied in the form of a digital television, a desktop computer, a laptop computer, personal digital assistants, cellular telephones, smartphones, set-top boxes, music players, web pads, tablet computer systems, game consoles, electronic book readers, or other devices with like capability. The secondary display device 106 includes a display 136. The display 136 may comprise, for example, one or more devices such as liquid crystal display (LCD) displays, gas plasma-based flat panel displays, organic light emitting diode (OLED) displays, LCD projectors, or other types of display devices, etc.

The secondary display device 106 may be configured to execute various applications such as a secondary display service 139 and/or other applications. The secondary display service 139 may be executed in a secondary display device 106, for example, to access secondary content data 130 served up by the computing environment 115 and/or other servers, thereby rendering the secondary content 112 on the display 136. The secondary display service 139 may, for example, include a video player, a browser, a mobile application, etc., and the secondary content 112 may correspond to a video clip, an audio clip, a network page, a mobile application screen, etc. The secondary display device 106 may be configured to execute applications beyond the secondary display service 139 such as, for example, browsers, mobile applications, email applications, social networking applications, and/or other applications.

Next, a general description of the operation of the various components of the networked environment 100 is provided. To begin, one or more primary display services 133 may be configured by users. For example, a user may associate a primary display device 103 with an account provided by the content server application 124. One or more secondary display devices 106 may then be registered with the primary display device 103 to provide an extended display for the primary display device 103. In one example, a user may explicitly configure identifying features (e.g., media access control (MAC) address, internet protocol (IP) address, security credentials, etc.) for each secondary display device 106 with the primary display service 133 to perform registration. In another example, the secondary display device(s) 106 may be registered with the primary display service 133 by way of push-button pairing or another approach.

In some cases, a user at the secondary display device 106 may select a primary display service 133 from a plurality of primary display services 133 corresponding to a plurality of primary display devices 103. In one example, a user may explicitly configure identifying features (e.g., media access control (MAC) address, internet protocol (IP) address, security credentials, etc.) for each primary display service 133 with the secondary display service 139 to perform registration.

A user may then select primary content 109 to be rendered on the primary display device 103. The primary display service 133 obtains the corresponding primary content data 127 from the content server application 124 and/or local storage. The primary content 109 is then rendered on the display 132 by the primary display service 133. The primary content 109 may or may not have supplemental secondary content 112. If the primary content 109 is associated with secondary content 112, the secondary content 112 may be rendered by the secondary display devices 106. Where different types of secondary content 112 exist, the user may designate different ones of the secondary display devices 106 to render the secondary content 112.

When secondary content 112 is to be rendered, the primary display service 133 may send a directive to the designated secondary display service 139. Alternatively, the directive may originate from the content server application 124. The directive may be based at least in part on the current state (e.g., temporal position, currently rendered content, etc.) of the primary content 109 that is being rendered by the primary display service 133.

Upon receiving the directive, the secondary display service 139 may then obtain the secondary content data 130 and render the secondary content 112 on the secondary display device 106. It is noted that there may be a "master"/"slave" relationship between the primary display device 103 and the secondary display device 106 as far as the primary content 109 may control the display of the secondary content 112. The secondary display service 139 may render a user interface for presenting the secondary content 112. For example, responsive to receiving the directive, the secondary display service 139 may launch a new window for presenting the secondary content 112. Alternatively, a user may launch the window in advance of receiving the directive for presenting the secondary content 112, and the window may be updated in response to the directive. In some cases, such a window is rendered only when needed and may be automatically minimized or hidden when user notification or user input is not needed. In one example, the secondary display service 139 may cease rendering the secondary content 112 in response to determining that communications with the primary display device 133 have been interrupted, e.g., the primary display service 133 or the secondary display service 139 is out-of-range on a local network portion of the network 118.

The secondary display service 139 may update the secondary content 112 in response to user input or automatically, e.g., in response to expiration of a predefined time period, in response to receiving a further directive, or in response to another predefined condition being met. In updating the secondary content 112, additional secondary content data 130 may be obtained. In some cases, user input may be obtained by way of the secondary display service 139 and sent to the primary display service 133 and/or the content server application 124. The user input may be used to control, at least in part, the rendering of the primary content 109 by the primary display device 103.

Several scenarios for use of the networked environment 100 will next be described. For example, may view a network page or other screen using a primary display device 103 and the page or screen may include a text input field. If a secondary display device 106 (e.g., a tablet with a touch-screen) is registered as a secondary display for the primary display device 103, a directive may be sent to the secondary display service 139 on the secondary display device 106 to render an on-screen keyboard for entering text. The text may be obtained from the secondary display service 139 by the content server application 124 or the primary display service 133, and provided as input for the text input field. Alternatively, if no appropriate secondary display device 106 is registered, the primary display service 133 may be configured to render an on-screen keyboard for use with a pointing device attached to the primary display device 103. In other words, when the secondary content 112 cannot be rendered by a secondary display service 139, the primary content 109 may be adjusted to accommodate the lack of a secondary display service 139.

As another example, a movie or other video content feature may be rendered as primary content 109 by the primary display service 133. Additional information about the cast members currently on screen may be rendered as supplemental secondary content 112 by the secondary display service 139. As the primary content 109 advances temporally, a directive related to the current state of the primary content 109 may be sent to the secondary display service 139 and/or the content server application 124 to enable the secondary content 112 to be updated and/or synchronized with what is being shown on the primary display device 103. For example, when a particular song is being played in the primary content 109, a detail page with a link to download the particular song may be surfaced as secondary content 112 on the secondary display device 106. Also, when a character in a video content feature corresponding to primary content 109 is wearing a particular pair of sunglasses, an offer for selling the particular sunglasses may be secondary content 112.

In one embodiment, while a video content feature is being rendered as primary content 109 on the primary display device 103, controls for the video content feature may be rendered as secondary content 112 on one or more secondary display devices 106. Such controls may include play, pause, fast forward, reverse, and so on. A directive to render the controls may be sent to the secondary display device 106 along with current state information regarding the video content feature, e.g., name, current temporal position, total length, etc. Upon selection of one or more controls, user input may be sent back to the content server application 124 and/or the video content feature. The user input may be employed to control the playback of the video content feature. In some cases, a preview screen for the video content feature may be rendered as secondary content 112 on the secondary display device 106.

As yet another example, a user may be browsing a list of items such as products, services, downloads, etc. on the primary display device 103. As the user selects a particular item, a directive to render detailed information about the item may be sent to the secondary display device 106. In other words, the primary content 109 may correspond to a category listing, search result listing, wish list listing, watch list listing, etc. Conversely, the secondary content 112 may correspond to a listing of items that are relevant to the primary content 109 being rendered. For example, when viewing a detail page regarding a particular item on the primary display device 103, a listing of similar or other recommended items may be rendered on the secondary display device 106.

In various embodiments, the secondary display devices 106 may implement a social experience. For example, users at one secondary display device 106 may interact with users at another secondary display device 106 regarding primary content 109 being shown on a primary display device 103. One user may view a trailer for a video content feature corresponding to the primary content 109, while another user may view cast biographical information corresponding to the primary content 109.

Communications may be peer-to-peer between the secondary display devices 106 and/or client-server between the secondary display devices 106 and the content server application 124 or between the secondary display devices 106 and the primary display service 133. In one embodiment, user input received from one secondary display device 106 may influence a directive to render secondary content 112 that is sent to another secondary display device 106. For example, user input obtained from a secondary display device 106 rendering an on-screen keyboard may result in the update of a listing of items rendered on a different secondary display device 106 that is registered with the same primary display device 103.

In one embodiment, primary content 109 may be transferred to a secondary display device 106, and secondary content 112 may be transferred to a primary display device 103. For example, a video content feature may be rendered on a primary display device 103, and a user may request that the video content feature be rendered instead on the secondary display device 106. In response to the request, the corresponding primary display service 133 (and/or the content server application 124) may send a directive to the corresponding secondary display service 139 to render the primary content 109 in place of the secondary content 112. The directive may specify a temporal location in the primary content 109 so that the primary content 109 remains synchronized when transferred from the primary display device 103 to the secondary display device 106. The primary display device 103, in response to the request, may then cease displaying the primary content 109, and may in some cases begin rendering the secondary content 112 where left off by the primary display device 103.

Figure 3:
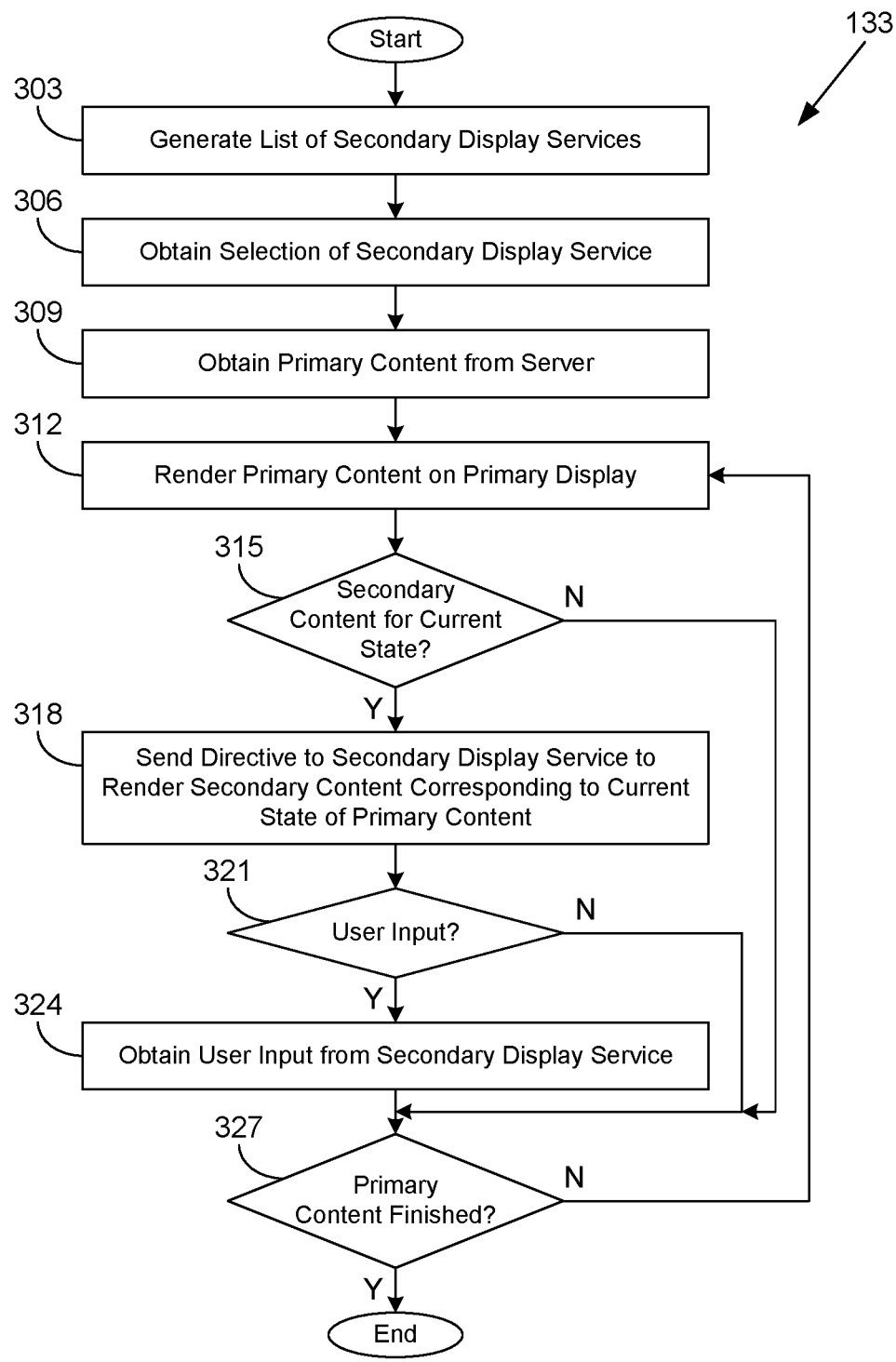
FIG. 3 is a flowchart illustrating one example of functionality implemented as portions of a primary display service executed in a primary display device in the networked environment of FIG. 2 according to various embodiments of the present disclosure.

Referring next to FIG. 3, shown is a flowchart that provides one example of the operation of a portion of the primary display service 133 according to various embodiments. It is understood that the flowchart of FIG. 3 provides merely an example of the many different types of functional arrangements that may be employed to implement the operation of the portion of the primary display service 133 as described herein. As an alternative, the flowchart of FIG. 3 may be viewed as depicting an example of steps of a method implemented in the primary display device 103 (FIG. 2) according to one or more embodiments.

Beginning with box 303, the primary display service 133 generates a list of secondary display services 139 (FIG. 2). For example, the primary display service 133 may detect all secondary display services 139 coupled to a local network, registered to a user account in the computing environment 115 (FIG. 1), paired with the primary display service 133, and/or otherwise available for detection. In box 306, the primary display service 133 obtains a selection of a secondary display service 139. For example, the primary display service 133 may render a user interface on the display 132 (FIG. 1) containing a listing of the detected secondary display services 139, and the user may enter a selection from the listing. In one embodiment, the listing may include icons or other indicia representing the corresponding secondary display devices 106 (FIG. 2) of the secondary display services 139.

Such a selection may be stored for future use by the primary display service 133. In one embodiment, the selection may be stored in association with a user account in the computing environment 115. In some cases, multiple secondary display services 139 may be selected. If multiple secondary display services 139 are selected, each may be employed to render the same or different types of secondary content 112 (FIG. 2).

In box 309, the primary display service 133 obtains primary content data 127 (FIG. 2) from a content server application 124 (FIG. 2). Alternatively, the primary content data 127 may be stored or cached in data storage coupled to the primary display device 103. In box 312, the primary display service 133 renders the primary content 109 (FIG. 2) from the primary content data 127 on the display 132. In box 315, the primary display service 133 determines whether there is secondary content 112 for the current state of the primary content 109. If there is secondary content 112 for the current state of the primary content 109, the primary display service 133 proceeds to box 318.

In box 318, the primary display service 133 sends a directive to the selected secondary display service 139 to render secondary content 112 corresponding to the current state of the primary content 109. The secondary content 112 may supplement, augment, or otherwise be relevant to the current state of the primary content 109. In one embodiment, the directive may comprise a uniform resource locator (URL) or other instruction relating to obtaining the secondary content data 130 (FIG. 2) from the content server application 124. In another embodiment, the directive may be accompanied by secondary content data 130 being sent directly from the primary display service 133.

In box 321, the primary display service 133 determines whether user input is to be received from the secondary display service 139. For example, where the secondary content 112 comprises an on-screen keyboard, a list of items, and/or other content that elicits user input, user input may be received. If user input is to be received, the primary display service 133 moves to box 324 and obtains the user input from the secondary display service 139. The primary display service 133 then continues to box 327. If the primary display service 133 instead determines in box 321 that user input is not to be received, the primary display service 133 also continues to box 327. If the primary display service 133 instead determines in box 315 that secondary content 112 is not to be rendered for the current state of the primary content 109, the primary display service 133 also continues to box 327.

In box 327, the primary display service 133 determines whether the primary content 109 has finished. If the primary content 109 has not finished, the primary display service 133 returns to box 312 and continues rendering the primary content 109 on the display 132. If, instead, the primary content 109 has finished, the portion of the primary display service 133 ends.

Figure 4:
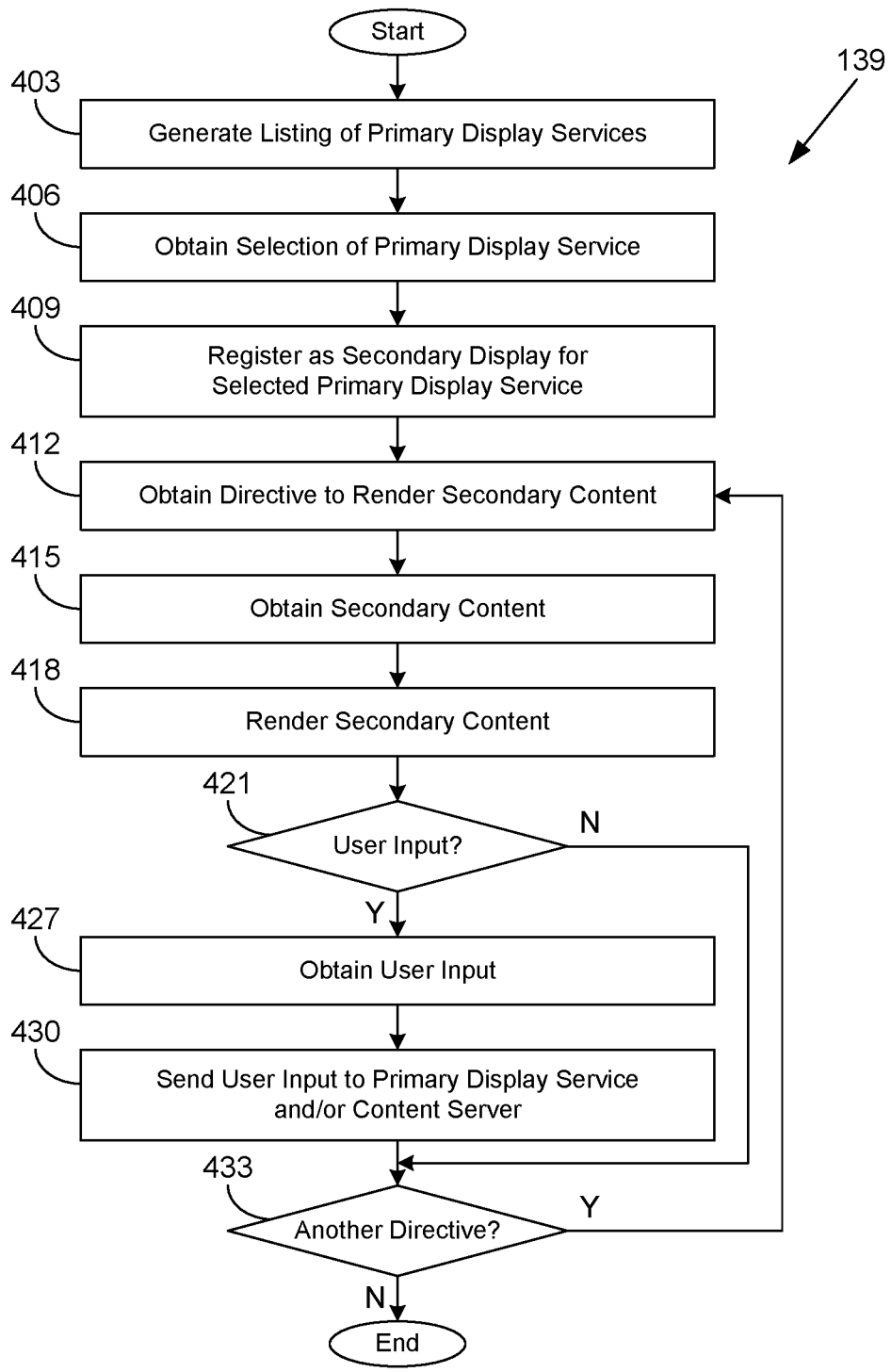
FIG. 4 is a flowchart illustrating one example of functionality implemented as portions of a secondary display service executed in a secondary display device in the networked environment of FIG. 2 according to various embodiments of the present disclosure.

Turning now to FIG. 4, shown is a flowchart that provides one example of the operation of a portion of the secondary display service 139 according to various embodiments. It is understood that the flowchart of FIG. 4 provides merely an example of the many different types of functional arrangements that may be employed to implement the operation of the portion of the secondary display service 139 as described herein. As an alternative, the flowchart of FIG. 4 may be viewed as depicting an example of steps of a method implemented in the secondary display device 106 (FIG. 2) according to one or more embodiments.

Beginning with box 403, the secondary display service 139 generates a listing of primary display services 133 (FIG. 2). For example, the primary display services 133 in the listing may comprise those primary display services 133 that are reachable by the secondary display service 139 via a local network, associated with a user account, paired, and/or are otherwise discoverable by the secondary display service 139. A user account or local network may have multiple primary display devices 103 (FIG. 1), e.g., one television in a living room, another television in a media room, and so on. In box 406, the secondary display service 139 may obtain a selection of one of the primary display devices 103. In box 409, the secondary display service 139 registers as a secondary display for the selected primary display service 133. In some cases, a pairing operation or other handshake may be performed between the secondary display service 139 and the selected primary display service 133.

In box 412, the secondary display service 139 obtains a directive to render secondary content 112 (FIG. 2) related to primary content 109 (FIG. 2) being rendered by the selected primary display service 133. In one embodiment, the directive may be received from the primary display service 133. In another embodiment, the directive may be received from a content server application 124 (FIG. 2). In box 415, in response to the directive, the secondary display service 139 may obtain secondary content data 130 (FIG. 2) from the content server application 124 and/or the primary display service 133. In some cases, the secondary content data 130 may be stored or cached by data storage attached to the secondary display device 106. In box 418, the secondary display service 139 renders the secondary content 112 corresponding to the secondary content data 130 in response to the directive.

In box 421, the secondary display service 139 determines whether user input is to be obtained. For example, the rendered secondary content 112 may elicit user input, e.g., text to fill out a form, a user selection of an item from a list of items, and so on. If user input is to be obtained, the secondary display service 139 proceeds to box 427 and obtains the user input by way of an input device, e.g., touchscreen, touchpad, keyboard, mouse, etc. In box 430, the secondary display service 139 sends the user input to the primary display service 133 and/or the content server application 124. The secondary display service 139 continues to box 433. If the secondary display service 139 instead determines in box 421 that user input is not to be obtained, the secondary display service 139 also continues to box 433.

In box 433, the secondary display service 139 determines whether another directive to render secondary content 112 is to be obtained. If another directive is to be obtained, the secondary display service 139 returns to box 412 and obtains another directive to render secondary content 112. If another directive is not to be obtained, the portion of the secondary display service 139 ends.

Figure 5:
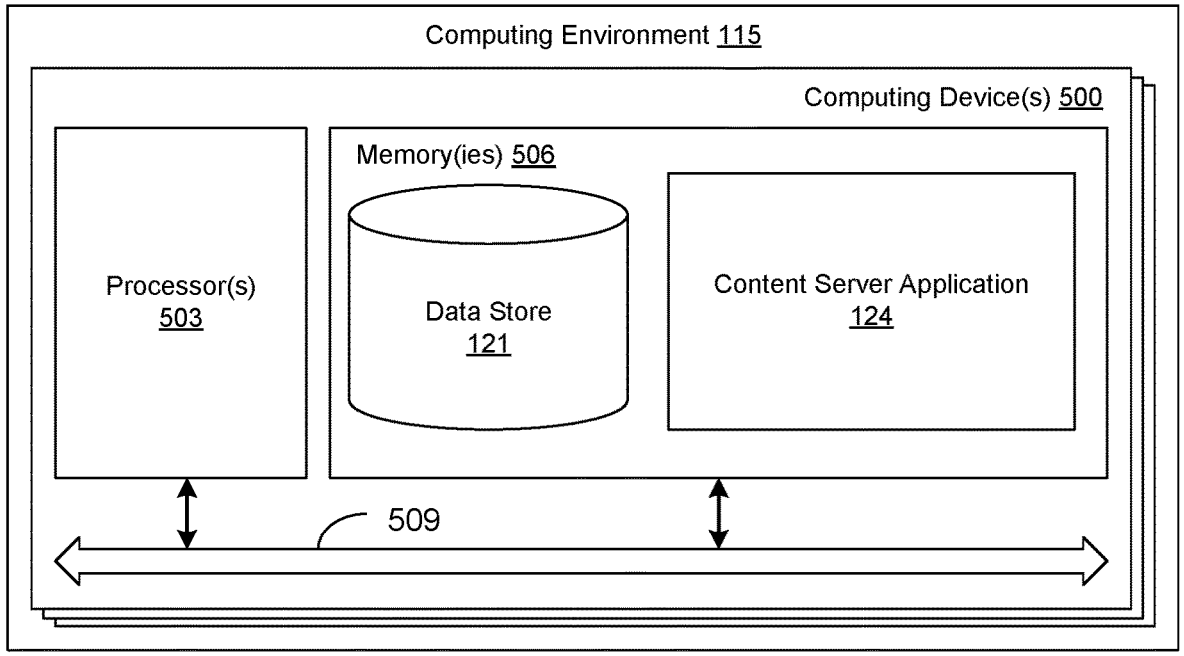
FIG. 5 is a schematic block diagram that provides one example illustration of a computing environment employed in the networked environment of FIG. 2 according to various embodiments of the present disclosure.

With reference to FIG. 5, shown is a schematic block diagram of the computing environment 115 according to an embodiment of the present disclosure. The computing environment 115 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506, 606 and executable by the processor 503 is the content server application 124 and potentially other applications. Also stored in the memory 506 may be a data store 121 and other data. In addition, an operating system may be stored in the memory 506 and executable by the processor 503.

Figure 6:
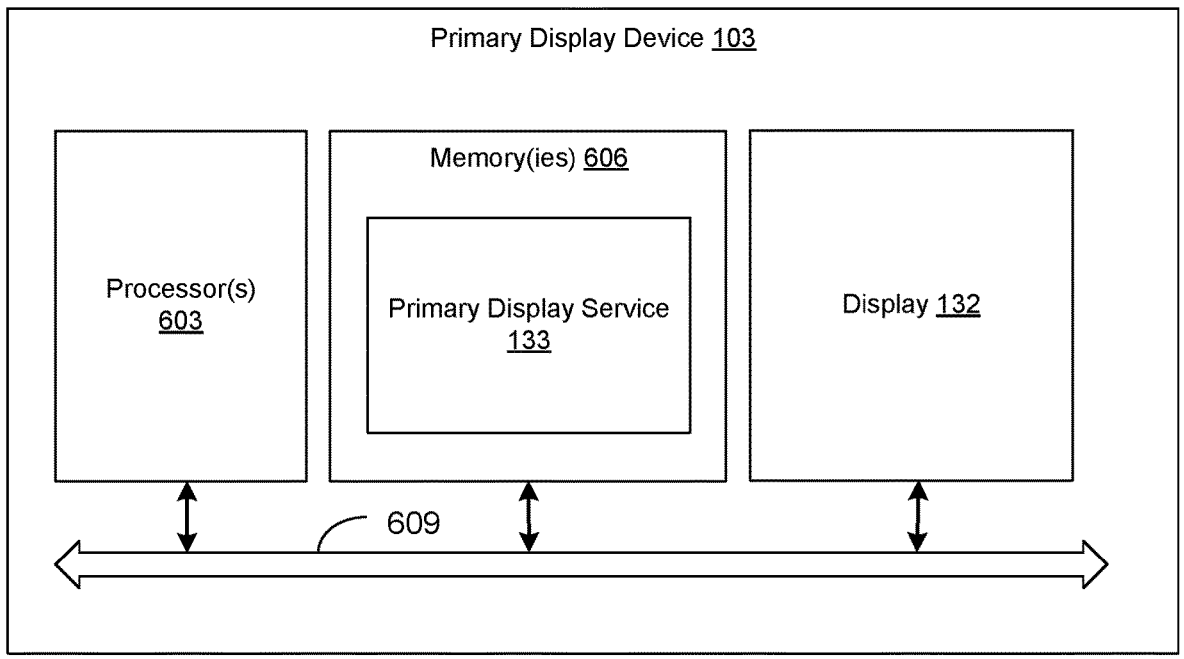
FIG. 6 is a schematic block diagram that provides one example illustration of a primary display device employed in the networked environment of FIG. 2 according to various embodiments of the present disclosure.

Moving on to FIG. 6, shown is a schematic block diagram of the primary display device 103 according to an embodiment of the present disclosure. The primary display device 103 includes at least one processor circuit, for example, having a processor 603, a memory 606, a display 132, all of which are coupled to a local interface 609. To this end, the primary display device 103 may comprise, for example, at least one television or like computing device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 is the primary display service 133 and potentially other applications. Also stored in the memory 606 may be a data store and other data. In addition, an operating system may be stored in the memory 606 and executable by the processor 603.

With reference to both FIGS. 5 and 6, it is understood that there may be other applications that are stored in the memory 506, 606 and are executable by the processor 503, 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506, 606 and are executable by the processor 503, 603. In this respect, the term "executable" means a program file that is in a form that can ultimately be run by the processor 503, 603. Examples of executable programs may be, for example, a compiled program that can be translated into machine code in a format that can be loaded into a random access portion of the memory 506, 606 and run by the processor 503, 603, source code that may be expressed in proper format such as object code that is capable of being loaded into a random access portion of the memory 506, 606 and executed by the processor 503, 603, or source code that may be interpreted by another executable program to generate instructions in a random access portion of the memory 506, 606 to be executed by the processor 503, 603, etc. An executable program may be stored in any portion or component of the memory 506, 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506, 606 is defined herein as including both volatile and nonvolatile memory and data storage components. Volatile components are those that do not retain data values upon loss of power. Nonvolatile components are those that retain data upon a loss of power. Thus, the memory 506, 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503, 603 may represent multiple processors 503, 603 and/or multiple processor cores and the memory 506, 606 may represent multiple memories 506, 606 that operate in parallel processing circuits, respectively. In such a case, the local interface 509, 609 may be an appropriate network that facilitates communication between any two of the multiple processors 503, 603, between any processor 503, 603 and any of the memories 506, 606, or between any two of the memories 506, 606, etc. The local interface 509, 609 may comprise additional systems designed to coordinate this communication, including, for example, performing load balancing. The processor 503, 603 may be of electrical or of some other available construction.

Although the content server application 124, the primary display service 133, the secondary display service 139 (FIG. 2), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5 and 6 show the functionality and operation of an implementation of portions of the primary display service 133 and the secondary display service 139. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503, 603 in a computer system or other system. The machine code may be converted from the source code, etc. If embodied in hardware, each block may represent a circuit or a number of interconnected circuits to implement the specified logical function(s).

Although the flowcharts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. Further, in some embodiments, one or more of the blocks shown in FIGS. 5 and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content server application 124, the primary display service 133, and the secondary display service 139, that comprises software or code can be embodied in any non-transitory computer-readable medium for use by or in connection with an instruction execution system such as, for example, a processor 503, 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
    transmitting, by at least one first computing device corresponding to one or more servers, first content to a second computing device for rendering on a first display device;
    determining, by the at least one first computing device, a current state of the first content rendered on the first display device; and
    sending, by the at least one first computing device, a directive to a third computing device to render second content that is synchronized to be relevant to the current state of the first content on a second display device corresponding to the third computing device, wherein the second content comprises a list of cast members currently on screen in the first content, and the third computing device corresponds to a mobile computing device.

2. The method of claim 1, further comprising sending, by the at least one first computing device, an updated version of the second content to the third computing device in response to an expiration of a predefined time period.

3. The method of claim 1, wherein the second content is cached by the third computing device.

4. The method of claim 1, further comprising:
receiving, by the at least one first computing device, a request from the second computing device to render third content;
ceasing, by the at least one first computing device, transmitting of the first content to the second computing device for rendering on the first display device;
transmitting, by the at least one first computing device, the third content to the second computing device for rendering on the first display device; and
sending, by the at least one first computing device, a subsequent directive to the third computing device to render fourth content that is synchronized to be relevant to a current state of the third content on the second display device corresponding to the third computing device, wherein the fourth content comprises a list of cast members currently on screen in the third content.

5. The method of claim 1, further comprising causing, by the at least one first computing device, the second computing device to render a user interface including a list of a plurality of third computing devices, wherein the user interface facilitates a selection of the third computing device from among the plurality of third computing devices.

6. The method of claim 1, further comprising receiving, by the at least one first computing device, a selection of the third computing device from the second computing device.

7. The method of claim 1, further comprising receiving, by the at least one first computing device, a specification of a type of supplemental content from the second computing device, wherein the directive to render the second content is of the type specified.

8. The method of claim 1, wherein the second content further comprises a link to download a particular song currently being played in the first content.

9. The method of claim 1, wherein the second content further comprises an offer for sale of an item currently worn by a particular cast member in the first content.

10. A system, comprising:
at least one first computing device corresponding to one or more servers; and
instructions executable in the at least one first computing device, wherein when executed the instructions cause the at least one first computing device to at least:
transmit first content to a second computing device for rendering on a first display device;
determine a current state of the first content rendered on the first display device; and
send a directive to a third computing device to render second content that is synchronized to be relevant to the current state of the first content on a second display device corresponding to the third computing device, wherein the second content comprises a list of cast members currently on screen in the first content, and the third computing device corresponds to a mobile computing device.

11. The system of claim 10, wherein when executed the instructions further cause the at least one first computing device to at least transmit the second content to the third computing device.

12. The system of claim 10, wherein when executed the instructions further cause the at least one first computing device to at least:
receive a request from the second computing device to render third content;
transmit the third content to the second computing device for rendering on the first display device; and
send a subsequent directive to the third computing device to render fourth content that is synchronized to be relevant to a current state of the third content on the second display device corresponding to the third computing device, wherein the fourth content comprises a list of cast members currently on screen in the third content.

13. The system of claim 10, wherein when executed the instructions further cause the at least one first computing device to at least cause the second computing device to render a user interface including a list of a plurality of third computing devices, wherein the user interface facilitates a selection of the third computing device from among the plurality of third computing devices.

14. The system of claim 10, wherein when executed the instructions further cause the at least one first computing device to at least receive a selection of the third computing device from the second computing device.

15. The system of claim 10, wherein when executed the instructions further cause the at least one first computing device to at least receive a specification of a type of supplemental content from the second computing device, wherein the directive to render the second content is of the type specified.

16. A non-transitory computer-readable medium embodying a program executable in at least one first computing device corresponding to one or more servers, wherein when executed the program causes the at least one first computing device to at least:
transmit first content to a second computing device for rendering on a first display device;
determine a current state of the first content rendered on the first display device; and
send a directive to a third computing device to render second content that is synchronized to be relevant to the current state of the first content on a second display device corresponding to the third computing device, wherein the second content comprises a list of cast members currently on screen in the first content, and the third computing device corresponds to a mobile computing device.

17. The non-transitory computer-readable medium of claim 16, wherein when executed the program further causes the at least one first computing device to at least transmit the second content to the third computing device.

18. The non-transitory computer-readable medium of claim 16, wherein when executed the program further causes the at least one first computing device to at least:
receive a request from the second computing device to render third content;
transmit the third content to the second computing device for rendering on the first display device; and
send a subsequent directive to the third computing device to render fourth content that is synchronized to be relevant to a current state of the third content on the second display device corresponding to the third computing device, wherein the fourth content comprises a list of cast members currently on screen in the third content.

19. The non-transitory computer-readable medium of claim 16, wherein when executed the program further causes the at least one first computing device to at least cause the second computing device to render a user interface including a list of a plurality of third computing devices, wherein the user interface facilitates a selection of the third computing device from among the plurality of third computing devices.

20. The non-transitory computer-readable medium of claim 16, wherein when executed the program further causes the at least one first computing device to at least receive a specification of a type of supplemental content from the second computing device, wherein the directive to render the second content is of the type specified.

* * * * *